Dec. 20, 1927.

L. D. SOUBIER 1,653,479

GLASS FEEDER

Filed May 12, 1923

INVENTOR

LEONARD D. SOUBIER

BY J. F. Rule

HIS ATTORNEY

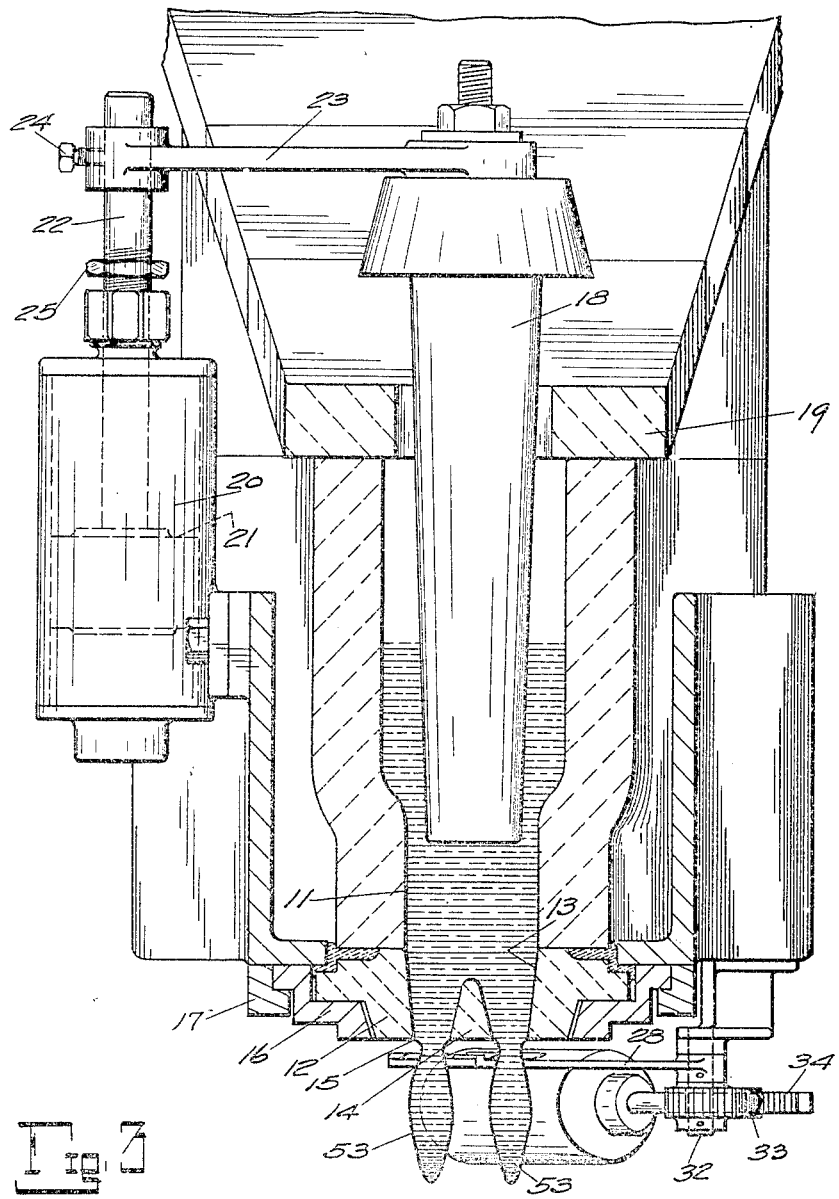

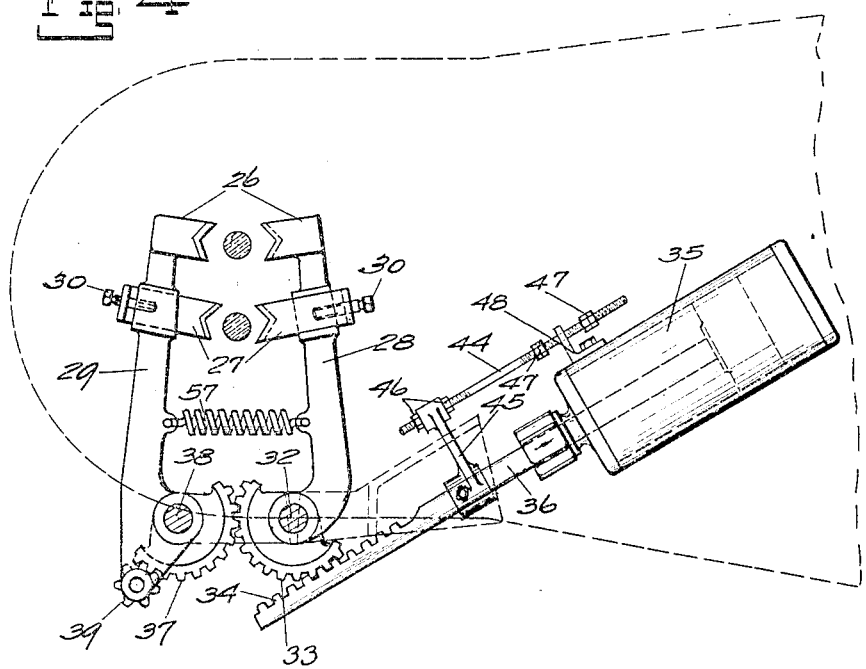
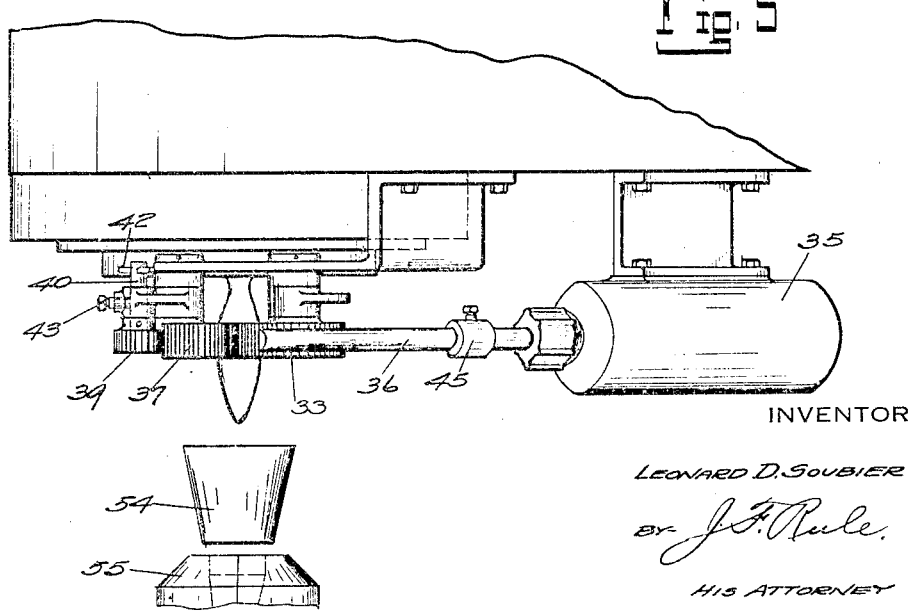

Patented Dec. 20, 1927.

1,653,479

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed May 12, 1923. Serial No. 638,463.

My invention relates to apparatus for forming individual charges or masses of molten glass suitable for entering the molds of a glass forming machine. More particularly, the invention has reference to mechanism for simultaneously producing a plurality of such charges and delivering them to the molds.

An object of my invention is to provide a practical glass feeder adapted to simultaneously deliver a plurality of mold charges or gobs of glass of comparatively small size. At the present day, glass feeders are designed to deliver a single charge at a time and ordinarily comprise a single reciprocating plug or plunger working in the glass over an outlet opening to control the discharge. It has also been proposed to simultaneously produce a plurality of charges by providing several outlet openings and a separate plunger to control each opening. In such arrangement, particularly where the openings are comparatively small, the plungers are apt to break, as they are subject to considerable strain. They also wear away comparatively rapidly, owing to the chemical and abrasive action of the glass while at a high temperature. These difficulties are practically overcome in the present invention by providing a single regulating plug of large size and great strength as compared with the smaller individual plugs.

Other objects of the invention will appear hereinafter.

In the accompanying drawings:

Figure 3 is a section at the line III—III on Figure 1, on a larger scale.

Figure 4 is a plan view of the cutting apparatus.

Figure 5 is an elevation of the same.

Figure 1:
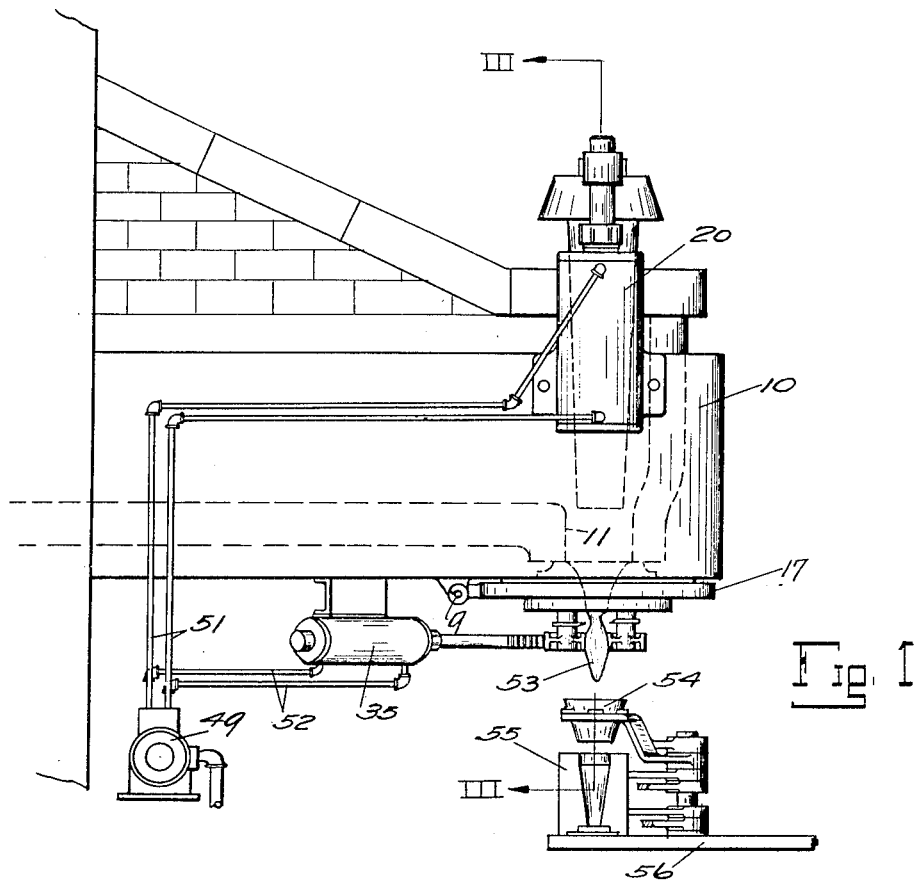
Figure 1 is a side elevation of a furnace boot and glass feeder constructed in accordance with my invention.
Figure 2:
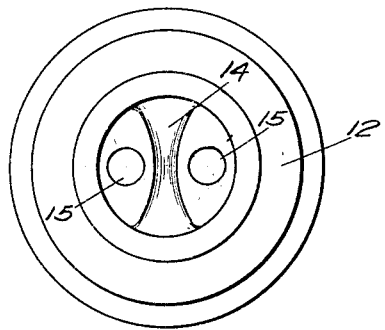
Figure 2 is a plan view of the bushing containing the outlet openings.

The glass for forming the mold charges may be supplied from a furnace having a boot extension or forehearth 10 formed at its forward end with a well 11 extending through the floor of the boot. At the lower end of said well is a bushing 12 formed of fire clay or other refractory material. The bushing is provided with an opening 13 forming a continuation of the well 11, said opening merging into two restricted apertures terminating at their lower ends in outlet openings 15, said apertures being separated by a partition wall or bridge 14 extending across the opening 13 and forming an integral part of the bushing. The bushing may be held in place by a cast iron sleeve 16 supported in a ring 17 hinged at 9 (Fig. 1) to the frame which supports the forehearth 10.

The discharge of glass through the outlets 15 is regulated and controlled by a regulator 18 consisting of a clay plug or plunger projecting downward through an opening in the upper wall 19 of the boot into the well 11. The plunger is actuated by an air motor 20 having a piston 21 and piston rod 22. The plunger is connected to the piston rod by a horizontal arm 23 which is adjustable up and down on the rod and held in adjusted position by a set screw 24. The downward movement of the plunger may be limited by a stop nut 25 adjustable up and down on the piston rod to adjust the lowermost position of the plunger.

The cutting mechanism comprises pairs of blades 26 and 27 mounted on swinging arms 28 and 29. Either or both pairs of blades may be adjustable on the arms. As shown, the blades 27 are adjustable toward and from each other, adjusting screws 30 being provided to permit a nice adjustment. By suitable adjustment of one pair of blades, the two pairs may be made to sever the gobs simultaneously, or may be adjusted so that either pair will operate in advance of the other.

The arm 28 is keyed to a rock shaft 32 to which is also keyed a gear segment 33 running in mesh with a rack 34 driven by an air motor 35, the rack being formed on an extension of the piston rod 36 of the motor. The gear 33 meshes with a segmental gear 37 mounted on a shaft 38, on which the arm 29 is also mounted. An adjusting pinion 39 keyed to a shaft 40 journalled in the arm 29, meshes with the gear 37. By rotating the pinion 39, as by means of a pin 42 in the shaft 40, the knife arm 29 may be rotatively adjusted relative to the gear 37 about the axis of the shaft 38. A set screw 43 locks the shaft 40 and holds the parts in their adjusted position.

The swinging movements of the knife arms are limited by a stop rod 44 carried by an arm 45 mounted on the rod 36 and adjustable lengthwise thereof. The stop rod 44 is also adjustable lengthwise in the arm 45, and is provided with screw threads and lock nuts 46 for clamping it to the arm 45 in its adjusted position. The rod 44 extends through an opening in a lug 48 and is movable freely therein. Adjustable stops 47 limit the movement of the rod in both directions.

The supply of air for operating the plunger motor 20 and the shear motor 35 may be supplied from any suitable source and is controlled by a timing device 49 (Fig. 1) having pipe connections 51 and 52 with the motors 20 and 35 respectively. The charges or gobs of glass 53 when severed, drop through funnel guides 54 into molds 55. The guides and molds may be mounted on a mold carriage 56 forming part of a glass blowing machine, the carriage being rotated either intermittently or continuously to bring the molds successively to a charging position beneath the feeder.

A coil spring 57 connected at its ends to the cutter arms 28 and 29 is under constant tension. This spring serves to take up all lost motion between the rack and pinions, so that the cutter arms operate promptly and positively in response to the operation of the motor 35.

The operation may be summarized as follows: The air motor 20 is periodically operated for lifting and lowering the plunger 18. As the plunger moves downward into the well 11, it exerts an expelling force on the glass. Under the influence of this force and the action of gravity, the glass is extruded through the outlets 15 in the form of suspended masses or gobs 53. The motor 35 now operates the shears to sever the gobs, permitting them to drop either simultaneously or successively into the molds 55, depending on the adjustment of the knives. When the plunger is moved upward, it exerts an upward pull on the glass, serving to temporarily retard the flow and in some instances to draw stubs of glass back into the well after the gobs have been severed. The operations of the plunger and shears are synchronized with each other and with the movements of the molds which receive the charges.

By varying the relative size of the outlets 15, charges of different size or volume may be simultaneously produced, although generally it is desirable to have the charges of the same size. The number of charges simultaneously formed under the control of the single plunger may be increased, if desired, by increasing the number of outlets 15.

Modifications other than those herein specified may be resorted to within the spirit and scope of my invention.

What I claim is:

1. The combination of a container for molten glass having a plurality of outlet openings through which the glass issues, means opening into the container to permit a flow of glass into the container and maintaining a continuous supply of glass within the container, a single device controlling the glass issuing from said openings, and automatic means to actuate said device and cause it to periodically exert an expelling force on the glass.

2. In apparatus for delivering charges of molten glass, the combination of a container for the glass having a plurality of adjacent continuously open apertures in the bottom thereof, means opening into the container to permit a flow of glass to the latter and maintaining a continuous supply of glass within the container, a single plunger projecting into the glass over said apertures, and automatic means to periodically reciprocate the plunger toward and from the apertures and thereby exert alternate expelling and retarding forces on the issuing glass, said plunger being of a size to control the flow of glass through all of said apertures and being maintained out of contact with the walls of the container so that a continuously open passageway is provided from the interior of the container to and through said apertures.

3. In a glass feeder, the combination of a receptacle to contain molten glass, said receptacle having a well extending downward from the floor thereof, and the floor of the well having a plurality of laterally spaced outlet apertures, means for supplying glass to the receptacle, whereby there is maintained a substantial head of glass in said well, a plunger projecting downwardly into the glass within the well, in position to at least partially overlie each of said apertures, and means for periodically reciprocating the plunger towards and from the apertures to exert alternate expelling and retarding forces on the issuing glass, the downward movement of the plunger being limited whereby it is at all times maintained out of contact with the bottom wall of the well so as to provide a continuous open passageway from the well through said apertures.

4. In a glass feeder, the combination of a receptacle to contain molten glass, said receptacle having a well extending downward from the floor thereof, the floor of the well having a plurality of laterally spaced outlet apertures, one portion of the walls of said apertures being substantially in alignment with and forming continuations of the wall of the well, means for supplying glass to the receptacle and for maintaining a substantial head of glass in said well, a plunger projecting downward into the glass within the well in position to partially overlie each of said apertures and of substantially smaller diameter than the well, and means for periodically reciprocating the plunger toward and from the apertures to exert alternate expelling and retarding forces on the issuing glass, whereby said plunger controls the flow of the glass through said apertures while there is maintained an open passageway extending between the periphery of the plunger and surrounding wall of the well, and thence through said apertures.

5. In a glass feeder, the combination of a receptacle to contain molten glass, a well extending downward from the floor of the receptacle, means providing a plurality of outlet apertures extending downward through the bottom of the well, a single plunger projecting into the glass, and automatic means to periodically reciprocate the plunger in said well and thereby cause it to exert periodic expelling and retracting forces alternately on the issuing glass to control the issuance of the glass through all of said apertures, said plunger being concentric with and of substantially smaller diamter than the well and maintained out of contact with the walls of the well so that a continuously open passageway is provided from the interior of the receptacle to and through said apertures.

6. A glass feeder comprising in combination, a receptacle to contain molten glass, said receptacle being provided with a plurality of adjacent outlet apertures, a regulating plunger projecting into the glass over the apertures and controlling the discharge of the glass therethrough, automatic means to periodically reciprocate the plunger toward and from the apertures while the latter are kept continuously open to the interior of the container, and thereby exerting alternate expelling and retarding forces on the issuing glass, cutters operable to sever the several charges of glass issuing from said openings, and means to actuate the cutters in synchronism with the movements of the plunger.

7. The combination of a container for molten glass having a plurality of downwardly directed apertures through which the glass issues, said apertures being continuously open to the interior of the container for the passage of glass from the container to the apertures, a single controlling device controlling the issuing glass, automatic means to periodically actuate said device and cause it to periodically exert an expelling force on the issuing glass, and shears cooperating with said controlling device to sever masses of glass suspended from the walls of said apertures, said shears being arranged to sever each mass at a plane spaced below the point of suspension.

8. The combination of a container for molten glass having a plurality of downwardly directed outlet apertures, a plunger projecting downward into the glass over said apertures and controlling the discharge through said apertures, means for periodically reciprocating the plunger vertically and causing it to exert alternate expelling and retarding forces on the issuing glass, said plunger being at all times spaced from the walls of the container to maintain a continuity of the supply body of glass within the container and that within the apertures, and shears operating periodically in timed relation to the movements of the plunger and at each operation severing a plurality of charges suspended from the walls of the outlet openings, the plane of severance being spaced below the point of suspension.

9. A glass feeder comprising in combination, a container for molten glass having a plurality of outlet openings through which glass issues and by which a plurality of gobs or masses of glass are concomitantly suspended from the walls of the outlets, means opening into the container to permit flow of glass to the latter, and shear mechanism operable periodically to sever the suspended charges singly in succession.

10. The combination of a furnace tank for molten glass having a lateral boot or extension forming a part thereof, said extension having a plurality of adjacent openings in the bottom thereof, a single device working in the glass within said boot and controlling the issuance of glass through the openings, and means for periodically actuating said device.

11. Means for segregating charges of molten glass from a supply body including shear mechanism, means for actuating said mechanism periodically to sever a plurality of charges during each complete operation of such mechanism, and means for adjusting the shear mechanism to effect severance of the plurality of charges either simultaneously or one in advance of the other.

12. Means for segregating individual masses or charges of glass from a supply body, comprising a plurality of cutters operating at separate points, means for actuating the cutters periodically in synchronism, means to effect relative adjustment of the cutters to cause them to operate either simultaneously or one in advance of the other.

Signed at Toledo, in the county of Lucas and State of Ohio, this 9th day of May, 1923.

LEONARD D. SOUBIER.